(12) United States Patent
Shen et al.

(10) Patent No.: US 11,188,933 B1
(45) Date of Patent: Nov. 30, 2021

(54) MULTI-OBJECTIVE OPTIMIZATION METHOD FOR POWER SYSTEM PEAK-SHAVING BASED ON INDEX LINKAGE ANALYSIS

(71) Applicant: DALIAN UNIVERSITY OF TECHNOLOGY, Liaoning (CN)

(72) Inventors: Jianjian Shen, Liaoning (CN); Chuntian Cheng, Liaoning (CN); Guangze Chen, Liaoning (CN); Sen Wang, Liaoning (CN); Shanzong Li, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 17/053,277

(22) PCT Filed: Mar. 6, 2020

(86) PCT No.: PCT/CN2020/078135
§ 371 (c)(1),
(2) Date: Nov. 5, 2020

(87) PCT Pub. No.: WO2021/142900
PCT Pub. Date: Jul. 22, 2021

(30) Foreign Application Priority Data

Jan. 16, 2020 (CN) .......................... 202010045539.4

(51) Int. Cl.
*G06Q 30/02* (2012.01)
(52) U.S. Cl.
CPC ................................ *G06Q 30/0202* (2013.01)
(58) Field of Classification Search
CPC ................................................ G06Q 30/0202
See application file for complete search history.

(56) References Cited

U.S. PATENT DOCUMENTS 3,906,242 A * 9/1975 Stevenson ............... H02J 3/144
307/38
4,023,043 A * 5/1977 Stevenson ............... H02J 3/14
307/38

(Continued)

FOREIGN PATENT DOCUMENTS

| CN | 106228462 A | 12/2016 |
| CN | 107292489 A | 10/2017 |

(Continued)

*Primary Examiner* — Breffni Baggot
(74) *Attorney, Agent, or Firm* — Muncy, Geissler, Olds and Lowe, P.C.

(57) ABSTRACT

The invention relates to a multi-objective optimization method for power system peak-shaving based on index linkage analysis. The invention comprehensively considers five peak shaving indexes, and introduces a linkage analysis theory in economics to test stationarity and causality of data series of peak-shaving indexes. The purpose is to effectively clarify linkage relationship between indexes. A regression analysis method is used to quantify the mutual influence relationship. A multi-index coupling peak shaving optimization model for generation scheduling is developed and finally solved by using genetic algorithm. The invention can objectively describe comprehensive peak shaving requirements of a provincial power grid, and is helpful for generation dispatcher to reduce subjective assumptions in the decision-making. Compared with a conventional single-index peak-shaving model, peak-shaving effect of our method is obviously improved, which provides a novel technical way for peak-shaving generation scheduling and decision-making in short-term operations of power systems.

1 Claim, 2 Drawing Sheets

(56) References Cited

U.S. PATENT DOCUMENTS

| | | | | |
|---|---|---|---|---|
| 4,315,404 | A * | 2/1982 | Schmitt | F28C 1/00 60/690 |
| 2011/0148209 | A1* | 6/2011 | Williams | H02J 7/34 307/75 |
| 2014/0119868 | A1* | 5/2014 | Wen | E02F 9/2292 414/687 |
| 2016/0370122 | A1* | 12/2016 | Fu | F28D 17/04 |
| 2019/0187637 | A1* | 6/2019 | Shen | G06Q 50/06 |
| 2020/0209812 | A1* | 7/2020 | Shen | G05B 13/041 |
| 2020/0385959 | A1* | 12/2020 | Zhang | E03B 11/02 |
| 2021/0170897 | A1* | 6/2021 | Ellis | B60L 53/53 |

FOREIGN PATENT DOCUMENTS

| | | |
|---|---|---|
| CN | 107992980 A | 5/2018 |
| CN | 110365057 A | 10/2019 |

\* cited by examiner

MULTI-OBJECTIVE OPTIMIZATION METHOD FOR POWER SYSTEM PEAK-SHAVING BASED ON INDEX LINKAGE ANALYSIS

TECHNICAL FIELD

The invention relates to the field of hydropower scheduling, focusing on a multi-objective optimization method for power system peak-shaving based on index linkage analysis.

BACKGROUND

Peak-shaving is a core task of the short-time generation scheduling of power systems, and it's also one of the key issues at home and abroad. Due to the large load difference between peak and off-peak and the increasing intermittent energy grid connection, most provincial power grids in China are facing severe peak-shaving pressure. Peak-shaving has become one of the main targets in the daily power generation scheduling of these power grids. From the perspective of the power grid, the main purpose of peak-shaving is optimizing the power generation plans of the dispatchable power plants to reduce the peak-valley difference of residual loads and smooth the fluctuations in the net load curve for coal-fired units with poor regulating performance. In order to achieve this goal, how to accurately describe the peak-shaving requirements becomes a key part of power generation scheduling.

Nowadays, the technical measures to deal with the peak-shaving pressure of power systems mainly include two aspects: One is to focus on the construction of energy storage systems and its potential of peak-shaving, such as introducing a peak demand charge into the energy cost function, the joint operation optimization of a hybrid system including a photovoltaic farm and battery-based energy storage, the complementary operation of photovoltaic-wind plant and hydro-pumping storage. The other is the peak-shaving optimization of conventional power plants such as thermal power plants, hydropower plants and so on. This kind of methods generally formulates models based on the variable of the net load. Some forms of a function of the net load are used to describe the peak-shaving needs, such as the minimum of the maximum residual peak-valley difference, the minimum of the variance or mean square deviation of remaining load, the maximum of the peak-shaving capacity and so on. Overall, these modelling methods can effectively reduce the maximum peak-valley difference or smooth the fluctuations in the load curve in appropriate situations. However, for the peak-shaving pressure or requirements facing provincial power grids, it is usually described by a peak-shaving index such as the peak-valley difference, the mean square deviation of remaining load, etc. The comprehensive analysis of the load demand is lacked. When the load demand of different power girds changed at different dates, there is a lack of attention on the applicability of each peak-shaving index and which peak-shaving index should be adopted to optimize the generation schedules for better peak-shaving results. It's a very important problem in the research of peak operations.

For the above problem, the invention proposes a multi-objective optimization method for power system peak-shaving based on index linkage analysis. This work is supported by the National Natural Science Foundation of China (52079014). Based on the engineering background of Xiluodu hydropower plant transmitting power to ZheJiang Power Grid, the invention is tested and applied. The results show that the invention can effectively avoid the deviation of peak-shaving results caused by single-index optimization as well as the uncertainty and irrationality of subjective factors. Thus, the optimized generation schedules are more effective and practical.

SUMMARY

The technical problem to be solved by the invention is to provide a multi-objective optimization method for power system peak-shaving based on index linkage analysis. The purpose is to reduce uncertainty and irrationality caused by the weight coefficient selection in the multi-objective processing strategy and to obtain balanced peak-shaving optimization results.

The technical solution of the invention:

A multi-objective optimization method for power system peak-shaving based on index linkage analysis is characterized by the following steps:

(1) Set initial calculation conditions, including operation conditions and constraints of hydropower plants, as well as conditions for electric and hydraulic operation demands;

(2) Five peak-shaving indexes are introduced, including load variance $$F_1 = \sum_{i=1}^{n}(P_{r,i}-\overline{P}_r)^2,$$

load difference between peak and off-peak $F_2=P_{r,max}-P_{r,min}$, maximum variation rate of loads $F_3=|P_{r,i}-P_{r,i-1}|_{max}$, maximum load $F_4=P_{r,max}$, minimum load $F_5=P_{r,min}$; where $P_r$ is residual load series; $P_{r,i}$ is residual load in period i; $P_{r,max}$ is maximum residual load; $P_{r,min}$ is minimum residual load; n is total number of periods. Thus, a multi-objective function is obtained:

$$MOP\begin{cases} minF_1 \\ minF_2 \\ minF_3 \\ minF_4 \\ maxF_5 \end{cases} \quad (1)$$

(3) According to historical data of daily load curve, values of the above five indexes are calculated to obtain five time series that are named $l_1$, $l_2$, $l_3$, $l_4$ and $l_5$, respectively.

(4) The following formula is used to calculate correlation coefficients between pairs of five series mentioned above:

$$r = \frac{\sum_{i=1}^{n}(l_{x,i}-\overline{l_x})(l_{y,i}-\overline{l_y})}{\sqrt{\sum_{i=1}^{n}(l_{x,i}-\overline{l_x})^2}\sqrt{\sum_{i=1}^{n}(l_{y,i}-\overline{l_y})^2}} \quad (2)$$

where r is correlation coefficient; $l_{x,i}$ and $l_{y,i}$ are values of sequence $l_x$ and sequence $l_y$ in period i, respectively; $\overline{l_x}$ and $\overline{l_y}$ are average values of sequence $l_x$ and sequence $l_y$, respectively. Correlation between five indexes is judged according to the follows: two indexes are highly correlated if $0.8<|r|<1$; two indexes are moderately correlated if $0.3<|r|<0.8$ and two indexes are lowly correlated if $|r|<0.3$.

(5) Based on the correlation between indexes, correlation analysis is carried out for indexes with moderate or higher correlation; a weight coefficient method is adopted for indexes with low correlation; a multi-objective peak-shaving objective is transformed into a single-objective peak-shaving model; specific steps are as follows:

Step 1. Check stationarity of time series. ADF test method is used; a generation process of sequence l is one of the following three forms:

$$\Delta l_t = \beta l_{t-1} + \sum_{i=1}^{k} \gamma_i \Delta l_{t-i} + u_i, l_0 = 0 \tag{3}$$

$$\Delta l_t = \mu + \beta l_{t-1} + \sum_{i=1}^{k} \gamma_i \Delta l_{t-i} + u_i, l_0 = 0 \tag{4}$$

$$\Delta l_t = \mu + \alpha t + \beta l_{t-1} + \sum_{i=1}^{k} \gamma_i \Delta l_{t-i} + u_i, l_0 = 0 \tag{5}$$

where $\alpha t$ is time trend; $\mu$ is displacement item;

$$\sum_{i=1}^{k} \gamma_i \Delta l_{t-1}$$

is lag item; k is number of lag items; $\Delta l_t$ is increment of t in sequence l that is calculated by $\Delta l_t = l_t - l_{t-1}$; original hypothesis and alternative hypothesis are $$\begin{cases} H_0: \beta = 0 (y_t \text{ nonstationary}) \\ H_1: \beta < 0 (y_t \text{ stationary}) \end{cases},$$

respectively; a judging criteria is $$\begin{cases} ADF \text{ value} \geq \text{threshold, accept } H_0, y_t \text{ nonstationary} \\ ADF \text{ value} < \text{threshold, accept } H_0, y_t \text{ stationary} \end{cases};$$

test the above three forms in turn; if one of them rejects original hypothesis, the sequence would be stable;

Step 2. Granger causality test is conducted among sequences with moderate correlation and stability. Regression models between them are as follows:

$$l_{y,t} = \sum_{i=1}^{p} \alpha_i l_{x,t-i} + \sum_{i=1}^{p} \beta_i l_{y,t-i} + \varepsilon_{1t} \tag{6}$$

$$l_{x,t} = \sum_{i=1}^{p} \lambda_i l_{y,t-i} + \sum_{i=1}^{p} \delta_i l_{x,t-i} + \varepsilon_{2t} \tag{7}$$

where $\alpha_i$, $\beta_i$, $\gamma_i$ and $\delta_i$ are regression coefficients; $\varepsilon_{1t}$, $\varepsilon_{2t}$ are random error items; p is a displacement item; carry out hypothesis testing for the two models, respectively; original hypothesis and alternative hypothesis are $$\begin{cases} H_0: \alpha_i = 0 \text{ (there is no Granger causality relation for } l_x \text{ by } l_y) \\ H_1: \alpha_i \neq 0 \text{ (there is Granger causality relation for } l_x \text{ by } l_y) \end{cases}$$

and $$\begin{cases} H_0: \lambda_i = 0 \text{ (there is no Granger causality relation for } l_x \text{ by } l_y) \\ H_1: \lambda_i \neq 0 \text{ (there is Granger causality relation for } l_x \text{ by } l_y) \end{cases}$$

respectively; according to test results, the Granger causality between sequences could be obtained; if there is Granger causality between $l_x$ and $l_y$, then corresponding index X would has an impact on index Y.

Step 3. Co-integration of unstable sequences. If an unstable sequence $l_y$ becomes a stable sequence after D times difference, then $l_y$ is integrated of order D; use OLS co-integration regression equation for two unstable sequences $l_x$ and $l_y$ with same integrated order; where T, U are regression coefficients; $X_t$ is residual; when $X_t$ is stable, then corresponding index X would has an impact on index Y;

Step 4. Regression analysis based on Granger causality of stable sequence and quantitative variation relationship of unstable sequences; choose the most affected one of five indexes as $\theta_0$; indexes which affect $\theta_0$ are denoted as $\theta_1$, $\theta_2, \ldots, \theta_m$, respectively; where m is number of indexes that affect $\theta_0$; a formula $\theta_0 = f(\theta_1, \theta_2, \ldots, \theta_m)$ is calculated by regression analysis;

Step 5. Construct a peak-shaving objective function; based on formula $\theta_0 = f(\theta_1, \theta_2, \ldots, \theta_m)$, the multi-objective function mentioned above can be transformed into a single-objective function by using a coefficient weight method for residual indexes such as $\theta_{n+1}, \theta_{n+2}, \ldots, \theta_4$; the function expression is as follows:

$$\min F = f(\theta_1, \theta_2, \ldots, \theta_m) + \sum_{i=m+1}^{4} \beta_i \theta_i \tag{8}$$

(5) Get the generation profile of power plants by using Genetic Algorithm method to solve the objective function in (4).

The invention has the following beneficial effects: compared with a normal single-objective peak-shaving model, a multi-objective coupling peak-shaving models could quantitatively describe reasonable relationship among five indexes of fluctuation degree, fluctuation range, peak value, valley value and maximum variation rate of load, balance peak-shaving results; it could effectively avoid an error of peak-shaving caused by a single-objective optimization; different indexes essentially reflect different peak-shaving demands of a power grid; through a correlation analysis between indexes, it could specify and definite load regulation demands of different power grids and different times, and obtain a more reasonable peak-shaving model, making optimized generation schedules more effective and useful; the invention describes complicated peak-shaving demand of power systems by using economic theory methods; this research approach is benefit to promote description of practical problems in power system generation scheduling, which could provide relatively objective optimization results and effectively avoid uncertainty and irrationality caused by subjective factors.

DETAILED DESCRIPTION

The specific embodiments of the present invention are further described below in conjunction with the drawings and technical solutions.

In order to describe peak-shaving effect accurately, the invention comprehensively considers variance, peak-valley difference, maximum, minimum and maximum variation rate of residual loads. Among them, the variance mainly reflects frequency of load changes in rise and fall directions, which is a requirement for flexible adjustment ability of generating units:

$$\sigma^2 = \sum_{i=1}^{n}(P_{r,i}-\overline{P}_r)^2 \quad (9)$$

$$P_{r,i}=P_1-N_1 \quad (10)$$

where $P_{r,i}$ is residual load at period i; $P_i$ is load of receiving-end power grid; $N_i$ is generation of optimized power plant.

The peak-valley difference $\Delta$ is a variation range of load, the smaller the range is, the smaller the peak-shaving capacity demand of generating units is:

$$\Delta = P_{r,max} - P_{r,min} \quad (11)$$

where $P_{r,max}$ is maximum residual load; $P_{r,min}$ is minimum residual load.

The maximum load $N_{r,max}$ reflects peak-shaving pressure of peak load periods that is a period with the maximum load response pressure of generating units. To ensure safe and stable operations of power grids, the residual load is expected to stay at a low level during peak periods in order to avoid peak-shaving difficulty of generating units.

$$N_{max} = P_{r,max} \quad (12)$$

The minimum load $N_{r,min}$ reflects peak-shaving pressure of valley load periods, which is limited by a forced generation of non-regulating units. During low load periods, the output of generating units is difficult to be effectively reduced with load, and it forces thermal units to work with in-depth peak-shaving, thereby resulting in a significant increase in energy consumption. Therefore, the residual load is expected to stay at a high level during valley periods.

$$N_{min} = P_{r,min} \quad (13)$$

The maximum variation rate $\Delta P_{r,max}$ of load is maximum variation of load in adjacent periods that reflects demand of load for climbing ability of generating units. The smaller the maximum variation rate of load is, the lower the demand for climbing ability of generating units is.

$$\Delta P_{r,max} = |P_{r,i} - P_{r,i-1}|_{max} \quad (14)$$

The objective function is constructed to minimize the variance, peak-valley difference, maximum and maximum variation rate of residual loads, and maximize the minimum of residual loads to ensure peak-shaving demands of different loads.

$$MOP\begin{cases} \min \sigma^2 \\ \min \Delta \\ \min N_{max} \\ \max N_{min} \\ \min \Delta P_{r,max} \end{cases} \quad (15)$$

The objective function mentioned above should meet the following constraints:

Water balance equation:

$$V_{t+1} = V_t + 3600(Q_t - S_t)\Delta t \quad (16)$$

where $S_t = q_t + d_t$;
$V_t$ is reservoir capacity of power plant at time t; $Q_t$ is reservoir inflow in period t, m³/s; $S_t$ is storage outflow of power plant in period t, m³/s; $q_t$ is power discharge of power plant in period t, m³/s; $d_t$ is abandoning water of power plant in period t, m³/s.

Relationship of water level and reservoir capacity:

$$Z_t = f_{ZV}(V_t) \quad (17)$$

where $Z_t$ is water level of power plant in period t, m; $f_{ZV}(\cdot)$ is a relation curve of water level and reservoir capacity of power plant.

The relationship of tailrace level and discharge capacity:

$$Z_t^d = f_{Z^d}(S_t) \quad (18)$$

where $Z_t^d$ is tailrace level of power plant in period t, m; $f_{Z^d}(\cdot)$ is a relation curve of tailrace level and discharge capacity of power plant.

Water head relationship:

$$h_t = (Z_t + Z_{t+1})/2 - Z_t^d \quad (19)$$

where $h_t$ is water head of power plant in period t, m.

The relationship of power station output:

$$N_t = f_{qh}(q_t, h_t) \quad (20)$$

where $N_t$ is generation of power plant in period t, MW; $f_{qh}(\cdot)$ is a NQH curve of power plant.

Electricity generation control:

$$E_{total} = \sum_{t=1}^{T} N_t \times \Delta t \quad (21)$$

where $E_{total}$ is given total amount of power generation, MWh.

Constraint of reservoir water level:

$$\underline{Z}_t \leq Z_t \leq \overline{Z}_t \quad (22)$$

where $\overline{Z}_t$ and $\underline{Z}_t$ are upper and lower water level of reservoir in period t, respectively, m.

Upper and lower limits of power generation:

$$\underline{N}_t \leq N_t \leq \overline{N}_t \quad (23)$$

where $\overline{N}_t$ and $\underline{N}_t$ are upper and lower average generation in period t of power plant, respectively, MW.

Constraint of power discharge:

$$\underline{q}_t \leq q_t \leq \overline{q}_t \quad (24)$$

where $\bar{q}_t$ and $\underline{q}_t$ are upper and lower power discharge in period t of power plant, respectively, m³/s.

Constraint of storage outflow:

$$\underline{S}_t \leq S_t \leq \bar{S}_t \qquad (25)$$

where $\bar{S}_t$ and $\underline{S}_t$ are upper and lower storage outflow in period t of m power plant, m³/s.

Taking the above multi-objective optimization model as the background, the invention is applied in a complete way according to the following (1) to (5) steps:

(1) Set initial calculation conditions, including operation conditions and constraints of hydropower plants, as well as conditions for electric and hydraulic operation demands;

(2) Five peak-shaving indexes are introduced, including load variance $$F_1 = \sum_{i=1}^{n} (P_{r,i} - \bar{P}_r)^2,$$

load difference between peak and off-peak $F_2 = P_{r,max} - P_{r,min}$, maximum variation rate of loads $F_3 = |P_{r,i} - P_{r,i-1}|_{max}$, maximum load $F_4 = P_{r,max}$, minimum load $F_5 = P_{r,min}$; where $P_r$ is residual load series; $P_{r,i}$ is residual load in period i; $P_{r,max}$ is maximum residual load; $P_{r,min}$ is minimum residual load; n is total number of periods. Thus, we get a multi-objective function:

$$MOP \begin{cases} \min F_1 \\ \min F_2 \\ \min F_3 \\ \min F_4 \\ \max F_5 \end{cases} \qquad (26)$$

(3) According to historical data of daily load curve, we can calculate values of the above five indexes to obtain five time series that are named $l_1$, $l_2$, $l_3$, $l_4$ and $l_5$, respectively.

(4) The following formula is used to calculate correlation coefficients between pairs of five series mentioned above:

$$r = \frac{\sum_{i=1}^{n}(l_{x,i} - \bar{l}_x)(l_{y,i} - \bar{l}_y)}{\sqrt{\sum_{i=1}^{n}(l_{x,i} - \bar{l}_x)^2}\sqrt{\sum_{i=1}^{n}(l_{y,i} - \bar{l}_y)^2}} \qquad (27)$$

where r is correlation coefficient; $l_{x,i}$ and $l_{y,i}$ are values of sequence $l_x$ and sequence $l_y$ in period i, respectively; $\bar{l}_x$ and $\bar{l}_y$ are average values of sequence $l_x$ and sequence $l_y$, respectively. Correlation between five indexes is judged according to the follows: two indexes are highly correlated if $0.8 < |r| < 1$; two indexes are moderately correlated if $0.3 < |r| < 0.8$ and two indexes are lowly correlated if $|r| < 0.3$.

(5) Based on the correlation between indexes, correlation analysis is carried out for indexes with moderate or higher correlation; a weight coefficient method is adopted for indexes with low correlation; a multi-objective peak-shaving objective is transformed into a single-objective peak-shaving model; specific steps are as follows:

Step 1. Check stationarity of time series. ADF test method is used; a generation process of sequence l is one of the following three forms:

$$\Delta l_t = \beta l_{t-1} + \sum_{i=1}^{k} \gamma_i \Delta l_{t-i} + u_i, l_0 = 0 \qquad (28)$$

$$\Delta l_t = \mu + \beta l_{t-1} + \sum_{i=1}^{k} \gamma_i \Delta l_{t-i} + u_i, l_0 = 0 \qquad (29)$$

$$\Delta l_t = \mu + \alpha t + \beta l_{t-1} + \sum_{i=1}^{k} \gamma_i \Delta l_{t-i} + u_i, l_0 = 0 \qquad (30)$$

where αt is time trend; μ is displacement item;

$$\sum_{i=1}^{k} \gamma_i \Delta l_{t-i}$$

is lag item; k is number of lag items; $\Delta l_t$ is increment of t in sequence l that is calculated by $\Delta l_t = l_t - l_{t-1}$; original hypothesis and alternative hypothesis are $$\begin{cases} H_0 : \beta = 0 (y_t \text{ nonstationary}) \\ H_1 : \beta < 0 (y_t \text{ stationary}) \end{cases},$$

respectively; a judging criteria is $$\begin{cases} ADF \text{ value} \geq \text{threshold}, \text{ accept } H_0, y_t \text{ nonstationary} \\ ADF \text{ value} < \text{threshold}, \text{ accept } H_0, y_t \text{ stationary} \end{cases};$$

test the above three forms in turn; if one of them rejects original hypothesis, the sequence would be stable;

Step 2. Granger causality test is conducted among sequences with moderate correlation and stability. Regression models between them are as follows:

$$l_{y,t} = \sum_{i=1}^{p} \alpha_i l_{x,t-i} + \sum_{i=1}^{p} \beta_i l_{y,t-i} + \varepsilon_{1t} \qquad (31)$$

$$l_{x,t} = \sum_{i=1}^{p} \lambda_i l_{y,t-1} + \sum_{i=1}^{p} \delta_i l_{x,t-i} + \varepsilon_{2t} \qquad (32)$$

where $\alpha_i$, $\beta_i$, $\gamma_i$ and $\delta_i$ are regression coefficients; $\varepsilon_{1t}$, $\varepsilon_{2t}$ are random error items; p is a displacement item; carry out hypothesis testing for the two models, respectively; original hypothesis and alternative hypothesis are $$\begin{cases} H_0 : \alpha_i = 0 \text{ (there is no Granger causality relation for } l_x \text{ by } l_y) \\ H_1 : \alpha_i \neq 0 \text{ (there is Granger causality relation for } l_x \text{ by } l_y) \end{cases}$$

and $$\begin{cases} H_0: \lambda_i = 0 \text{ (there is no Granger causality relation for } l_x \text{ by } l_y) \\ H_1: \lambda_i \neq 0 \text{ (there is Granger causality relation for } l_x \text{ by } l_y) \end{cases}$$

respectively; according to test results, the Granger causality between sequences could be obtained; if there is Granger causality between $l_x$ and $l_y$, then corresponding index X would has an impact on index Y.

Step 3. Co-integration of unstable sequences. If an unstable sequence $l_y$ becomes a stable sequence after D times difference, then $l_y$ is integrated of order D; use OLS co-integration regression equation for two unstable sequences $l_x$ and $l_y$ with same integrated order; where T, U are regression coefficients; $X_t$ is residual; when $X_t$ is stable, then corresponding index X would has an impact on index Y;

Step 4. Regression analysis based on Granger causality of stable sequence and quantitative variation relationship of unstable sequences; choose the most affected one of five indexes as $\theta_0$; indexes which affect $\theta_0$ are denoted as $\theta_1$, $\theta_2$, ..., $\theta_m$, respectively; where m is number of indexes that affect $\theta_0$; a formula $\theta_0 = f(\theta_1, \theta_2, \ldots, \theta_m)$ is calculated by regression analysis;

Step 5. Construct a peak-shaving objective function; based on formula $\theta_0 = f(\theta_1, \theta_2, \ldots, \theta_m)$, the multi-objective function mentioned above can be transformed into a single-objective function by using a coefficient weight method for residual indexes such as $\theta_{n+1}, \theta_{n+2}, \ldots, \theta_4$; the function expression is as follows:

$$\min F = f(\theta_1, \theta_2, \ldots, \theta_m) + \sum_{i=m+1}^{4} \beta_i \theta_i \quad (33)$$

(5) Get the generation profile of power plants by using Genetic Algorithm method to solve the objective function in (4).

Figure 1:
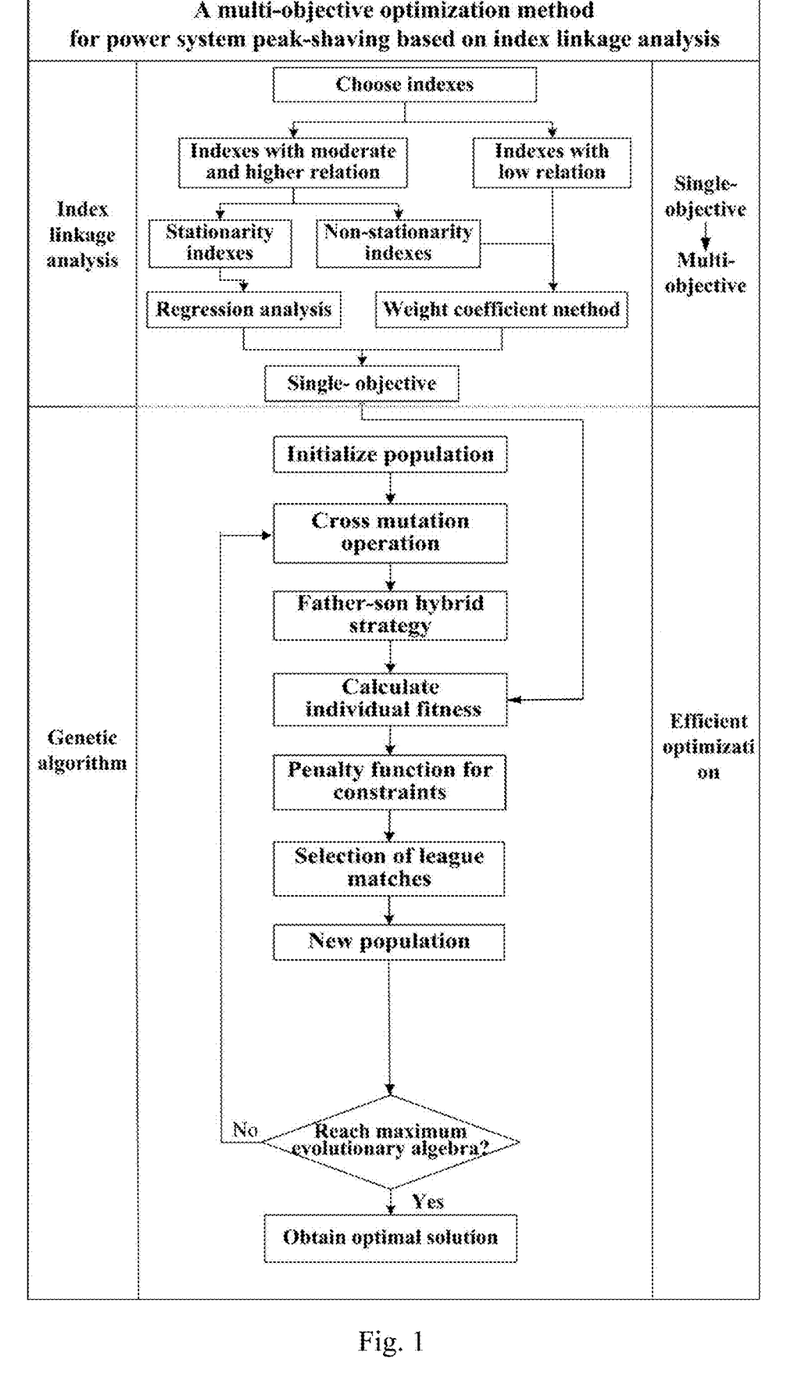
FIG. 1: A general solution frame diagram of the invention.
Figure 2:
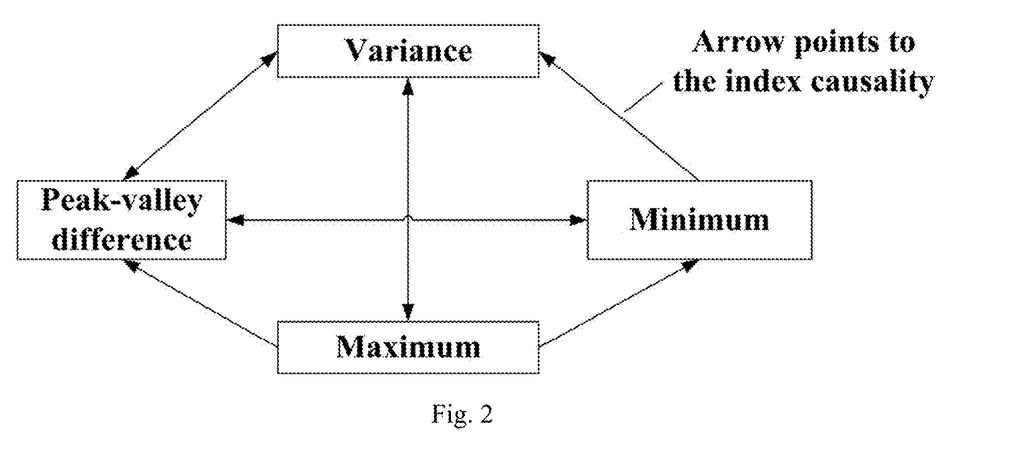
FIG. 2: A causal diagram of indexes.
Figure 3:
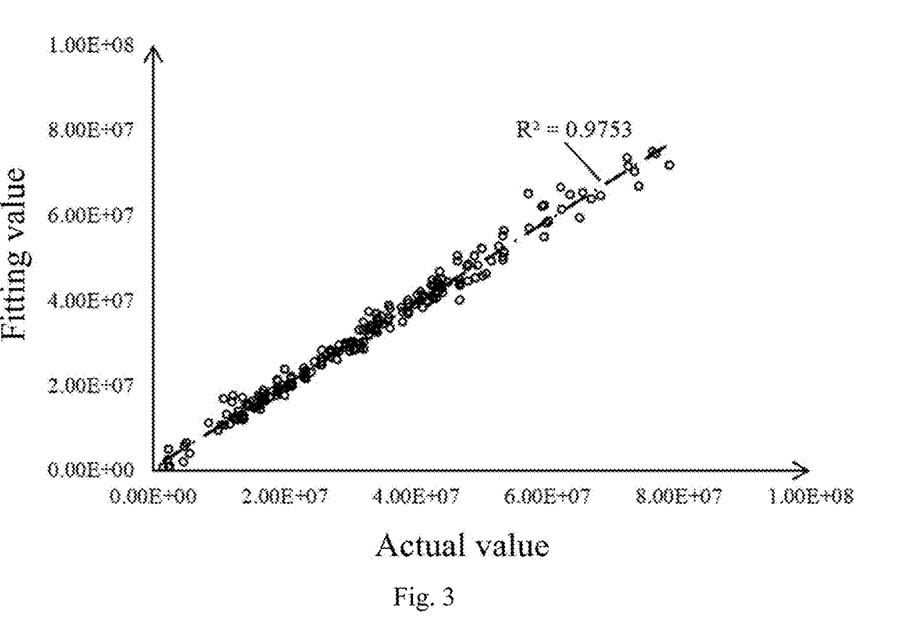
FIG. 3: Analysis of fitting effect.

Now, the presented model was verified by applying it to an actual engineering of Xiluodu Hydropower Plant. Xiluodu is one of main power suppliers of "Electricity Transmission Project from West to East", and it's also the biggest hydropower plant on the Jinsha River. There are 9 identical hydropower units of 770 MW each installed on the left and right sides of the river. Among them, generating units of the plant on the left banks provide electricity to Zhejiang via the Binjin UHVDC line. The proportion of thermal power in the Zhejiang Power Grid is up to 95%, which lacks flexible generation capacity and exhibits large daily load differences between peak and off-peak periods, facing a high peak-shaving pressure. Therefore, it's necessary to make use of flexible regulation characteristics of hydropower to meet peak-shaving requirements. Typical daily load curves of summer and winter in Zhejiang province are selected for calculation. The calculation results of correlation coefficient between indexes are given in Table 2, among which the maximum variation rate is of low correlation with other indexes, thus only four indexes, variance, peak-valley difference, maximum, minimum, need to be analyzed jointly. Stability test results are listed in Table 3, and it can be obtained that four indexes are stable without co-integration. The results of Granger causality test are listed in Table 4, so a causal guidance diagram can be drawn between these indexes, as shown in FIG. 2. Regression analysis was conducted according to the causality, and the following fitting formula could be obtained, and the fitting effect is shown as FIG. 3:

$$\theta_0 = 9.23 \times 10^8 - 0.041 \times \theta_1^2 + 0.462 \times \theta_2^2 - 37535 \times \theta_2 + 0.132 \times \theta_3^2 - 9529 \times \theta_3$$

where $\theta_0$ is variance; $\theta_1$ is peak-valley difference; $\theta_2$ is minimum; $\theta_3$ is maximum.

The index of maximum variation rate is treated by a weight coefficient method, and the following function could be obtained:

$$\min F = 9.23 \times 10^8 - 0.041 \times \theta_1^2 + 0.462 \times \theta_2^2 - 37535 \times \theta_2 + 0.132 \times \theta_3^2 - 9529 \times \theta_3 + \beta \theta_4$$

where $\theta_4$ is maximum variation rate; $\beta$ is weight coefficient.

Using the objective function mentioned above for the optimization, the indexes and decreasing ranges of corresponding index could be obtained and listed in Table 5 and Table 6, respectively. Among them, indexes of variance, peak-valley difference, maximum and the maximum variation rate showed a significant decline and the index of minimum showed a small decline. It can be seen that it has a significant peak-shaving effect in summer and winter, and effectively alleviates the peak-shaving pressure of the power grid.

TABLE 1

Basic data of power plant

| Plant name | Dead water level/m | Normal high water level/m | Installed capacity/MW | Regulation performance | Maximum reservoir discharge/m³/s | Maximum power discharge/m³/s |
|---|---|---|---|---|---|---|
| Xiluodu | 374.00 | 600.00 | 13860 | multi-year regulating | 100000 | 7749 |

TABLE 2

Calculation results of correlation coefficient

| R | Fluctuation degree | Fluctuation range | Peak value | Valley value | Maximum variation rate |
|---|---|---|---|---|---|
| Variance | 1 | | | | |
| Peak-valley difference | 0.949 | 1 | | | |
| Maximum | 0.720 | 0.861 | 1 | | |
| Minimum | −0.950 | −0.922 | −0.597 | 1 | |
| Maximum variation rate | 0.140 | 0.276 | 0.094 | −0.056 | 1 |

TABLE 3

Stability testing

| | ADF test value | 1% critical value | 5% critical value | Conclusion |
|---|---|---|---|---|
| Variance | −4.42021 | −3.43927 | −2.8653 | stable |
| Peak-valley difference | −3.74418 | −3.43926 | −2.86536 | stable |
| Maximum | −4.4423 | −3.43926 | −2.86536 | stable |
| Minimum | −4.13918 | −3.43926 | −2.86536 | stable |

TABLE 4

Results of Granger

| Null hypothesis | F-statistic | P value |
|---|---|---|
| Peak-valley difference is not Granger cause of variance | 25.349 5 | 3.00 × 10−27 |
| Variance is not Granger cause of Peak-valley difference | 13.853 4 | 6.00 × 10−15 |
| Minimum is not Granger cause of maximum | 2.335 3 | 0.030 6 |
| Variance is not Granger cause of minimum | 1.616 2 | 0.139 8 |
| Maximum is not Granger cause of variance | 18.092 4 | 1.00 × 10−19 |
| Variance is not Granger cause of maximum | 2.499 2 | 0.021 2 |
| Maximum is not Granger cause of Peak-valley difference | 4.781 8 | 9.00 × 10−05 |
| Peak-valley difference is not Granger cause of maximum | 0.488 7 | 0.817 1 |
| Minimum is not Granger cause of Peak-valley difference | 4.781 8 | 9.00 × 10−05 |
| Peak-valley difference is not Granger cause of minimum | 14.320 0 | 2.00 × 10−15 |
| Minimum is not Granger cause of maximum | 0.488 7 | 0.817 1 |
| Maximum is not Granger cause of minimum | 14.320 0 | 2.00 × 10−15 |

TABLE 5

Calculation results of indexes

| | Index | $\theta_0$/MW$^2$ | $\theta_1$/MW | $\theta_2$/MW | $\theta_3$/MW | $\theta_4$/MW |
|---|---|---|---|---|---|---|
| Typical summer days | Original load | 17 612 306 | 13 262 | 37 982 | 51 244 | 4 696 |
| | Residual load | 4 520 608 | 6 333 | 37 982 | 44 315 | 1 616 |
| Typical winter days | Original load | 2 531 061 | 5 156 | 43 401 | 48 557 | 4 183 |
| | Residual load | 144 675 | 1 103 | 41 789 | 42 892 | 1 103 |

TABLE 6

Decreasing range of indexes (%)

| Index | $\theta_0$ | $\theta_1$ | $\theta_2$ | $\theta_3$ | $\theta_4$ |
|---|---|---|---|---|---|
| Typical summer days | 74.3 | 52.2 | 0.0 | 13.5 | 65.6 |
| Typical winter days | 94.3 | 78.6 | 3.7 | 11.7 | 73.6 |

The invention claimed is:

1. A multi-objective optimization method for power system peak-shaving based on index linkage analysis, wherein comprising the following steps:
    (1) set initial calculation conditions, including operation conditions and constraints of hydropower plants, as well as conditions for electric and hydraulic operation demands;
    (2) five peak-shaving indexes are introduced, including load variance $$F_1 = \sum_{i=1}^{n}(P_{r,i} - \overline{P}_r)^2,$$

load difference between peak and off-peak $F_2=P_{r,max}-P_{r,min}$, maximum variation rate of loads $F_3=|P_{r,i}-P_{r,i-1}|_{max}$, maximum load $F_4=P_{r,max}$, minimum load $F_5=P_{r,min}$; where $P_r$ is residual load series; $P_{r,i}$ is residual load in period i; $P_{r,max}$ is maximum residual load; $P_{r,min}$ is minimum residual load; n is total number of periods; thus, a multi-objective function is obtained:

$$MOP\begin{cases} \min F_1 \\ \min F_2 \\ \min F_3 \\ \min F_4 \\ \max F_5 \end{cases} \quad (1)$$

(3) according to historical data of daily load curve, values of the above five indexes are calculated to obtain five time series that are named $l_1$, $l_2$, $l_3$, $l_4$ and $l_5$, respectively;
(4) Eq. (2) is used to calculate correlation coefficients between pairs of five series mentioned above:

$$r = \frac{\sum_{i=1}^{n}(l_{x,i} - \overline{l_x})(l_{y,i} - \overline{l_y})}{\sqrt{\sum_{i=1}^{n}(l_{x,i} - \overline{l_x})^2}\sqrt{\sum_{i=1}^{n}(l_{y,i} - \overline{l_y})^2}} \quad (2)$$

where r is correlation coefficient; $l_{x,i}$ and $l_{y,i}$ are values of sequence $l_x$ and sequence $l_y$ in period i, respectively; $\overline{l_x}$ and $\overline{l_y}$ are average values of sequence $l_x$ and sequence $l_y$, respectively; correlation between five indexes is judged according to the follows: two indexes are highly correlated if $0.8<|r|<1$; two indexes are moderately correlated if $0.3<|r|<0.8$ and two indexes are lowly correlated if $|r|<0.3$;
(5) based on the correlation between indexes, correlation analysis is carried out for indexes with moderate or higher correlation; a weight coefficient method is adopted for indexes with low correlation; a multi-objective peak-shaving objective is transformed into a single-objective peak-shaving model; specific steps are as follows:
Step 1. check stationarity of time series; ADF test method is used; a generation process of sequence l is one of the following three forms:

$$\Delta l_t = \beta l_{t-1} + \sum_{i=1}^{k}\gamma_i \Delta l_{t-i} + u_i, l_0 = 0 \quad (3)$$

$$\Delta l_t = \mu + \beta l_{t-1} + \sum_{i=1}^{k}\gamma_i \Delta l_{t-i} + u_i, l_0 = 0 \quad (4)$$

$$\Delta l_t = \mu + \alpha t + \beta l_{t-1} + \sum_{i=1}^{k}\gamma_i \Delta l_{t-i} + u_i, l_0 = 0 \quad (5)$$

where αt is time trend; μ is displacement item;

$$\sum_{i=1}^{k} \gamma_i \Delta l_{t-i} \quad (5)$$

is lag item; k is number of lag items; $\Delta l_t$ is increment of t in sequence l that is calculated by $\Delta l_t = l_t - l_{t-1}$; original hypothesis and alternative hypothesis are $$\begin{cases} H_0 : \beta = 0 (y_t \text{ nonstationary}) \\ H_1 : \beta < 0 (y_t \text{ stationary}) \end{cases},$$

respectively; a judging criteria is $$\begin{cases} ADF \text{ value} \geq \text{threshold,} \quad \text{accept } H_0, y_t \text{ nonstationary} \\ ADF \text{ value} < \text{threshold,} \quad \text{accept } H_0, y_t \text{ stationary} \end{cases};$$

test the above three forms in turn; if one of them rejects original hypothesis, the sequence would be stable;

Step 2. Granger causality test is conducted among sequences with moderate correlation and stability; regression models between them are as follows:

$$l_{y,t} = \sum_{i=1}^{p} \alpha_i l_{x,t-i} + \sum_{i=1}^{p} \beta_i l_{y,t-i} + \varepsilon_{1t} \quad (6)$$

$$l_{x,t} = \sum_{i=1}^{p} \lambda_i l_{y,t-i} + \sum_{i=1}^{p} \delta_i l_{x,t-i} + \varepsilon_{2t} \quad (7)$$

where $\alpha_i$, $\beta_i$, $\gamma_i$ and $\delta_i$ are regression coefficients; $\varepsilon_{1t}$, $\varepsilon_{2t}$ are random error items; p is a displacement item; carry out hypothesis testing for the two models, respectively; original hypothesis and alternative hypothesis are $$\begin{cases} H_0 : \alpha_i = 0 \text{ (there is no Granger causality relation for } l_x \text{ by } l_y) \\ H_1 : \alpha_i \neq 0 \text{ (there is Granger causality relation for } l_x \text{ by } l_y) \end{cases}$$

and $$\begin{cases} H_0 : \lambda_i = 0 \text{ (there is no Granger causality relation for } l_x \text{ by } l_y) \\ H_1 : \lambda_i \neq 0 \text{ (there is Granger causality relation for } l_x \text{ by } l_y) \end{cases}$$

respectively; according to test results, the Granger causality between sequences could be obtained; if there is Granger causality between $l_x$ and $l_y$, then corresponding index X would has an impact on index Y;

Step 3. co-integration of unstable sequences; if an unstable sequence $l_y$ becomes a stable sequence after D times difference, then $l_y$ is integrated of order D; use OLS co-integration regression equation for two unstable sequences $l_x$ and $l_y$ with same integrated order; where T, U are regression coefficients; $X_t$ is residual; when $X_t$ is stable, then corresponding index X would has an impact on index Y;

Step 4. regression analysis based on Granger causality of stable sequence and quantitative variation relationship of unstable sequences; choose the most affected one of five indexes as $\theta_0$; indexes which affect $\theta_0$ are denoted as $\theta_1, \theta_2, \ldots, \theta_m$, respectively; where m is number of indexes that affect $\theta_0$; a formula $\theta_0 = f(\theta_1, \theta_2, \ldots, \theta_m)$ is calculated by regression analysis;

Step 5. construct a peak-shaving objective function; based on Eq. $\theta_0 = f(\theta_1, \theta_2, \ldots, \theta_m)$, the multi-objective function mentioned above can be transformed into a single-objective function by using a coefficient weight method for residual indexes such as $\theta_{n+1}, \theta_{n+2}, \ldots, \theta_4$; it is shown as follows:

$$\min F = f(\theta_1, \theta_2, \ldots, \theta_m) + \sum_{i=m+1}^{4} \beta_i \theta_i \quad (8)$$

(5) get the generation profile of power plants by using genetic algorithm method to solve the objective function in (4).

\* \* \* \* \*